United States Patent [19]

Östergaard

[11] Patent Number: 4,966,921

[45] Date of Patent: Oct. 30, 1990

[54] METHOD, A COMPOUND, AND A BLOWING AGENT FOR MAKING PLASTIC FOAM

[76] Inventor: Hans Jörgen Östergaard, Egevej 1A, Lögten, DK-8541 Sködstrup, Denmark, DK-8541

[21] Appl. No.: 457,724

[22] PCT Filed: Jul. 14, 1988

[86] PCT No.: PCT/DK88/00120

§ 371 Date: Jan. 16, 1990

§ 102(e) Date: Jan. 16, 1990

[87] PCT Pub. No.: WO89/00594

PCT Pub. Date: Jan. 26, 1989

[30] Foreign Application Priority Data

Jul. 16, 1987 [DK] Denmark ............................ 3701/87
Dec. 23, 1987 [DK] Denmark ............................ 6828/87

[51] Int. Cl.$^5$ .............................................. C08J 9/14
[52] U.S. Cl. .................................. 521/131; 252/350; 521/98; 521/155
[58] Field of Search ................ 521/131, 155, 98; 252/350

[56] References Cited

U.S. PATENT DOCUMENTS 4,251,639 2/1981 Jarre et al. ........................... 521/159

FOREIGN PATENT DOCUMENTS 2918552 11/1979 Fed. Rep. of Germany .
2930881 5/1980 Fed. Rep. of Germany .

Primary Examiner—Morton Foelak
Attorney, Agent, or Firm—Antonelli, Terry, Stout & Kraus

[57] ABSTRACT

It is well known that the use of the blowing agent monofluortrichlormethane, also called Freon 11 or R-11, for the production of polyurethane foam is highly disadvantageous in that R-11 has a decomposing effect on the ozone layer around our planet. In spite of a vast scientific research it has not so far been possible to provide a practically usable substitute for R-11, but such a substitute of a simple nature is provided by the invention. According to the invention use is made of a mixture of specific substances, which are generally undangerous in use and also otherwise advantageous, but the boiling points of which are so remote from the usual working temperature that each one of the substances will be totally unusable for the purpose. The two primary substances are 1.1.1.trichloroethane and R-22 with boiling points 75°–76° C. and −41° C., respectively; when these substances are mixed and are mixed into the compound to be foamed the process conditions will widely correspond to the use of R-11, though further advantages are achievable.

6 Claims, No Drawings

METHOD, A COMPOUND, AND A BLOWING AGENT FOR MAKING PLASTIC FOAM

The present invention relates to a method, a compound and a blowing agent for the production of foamed plastics, primarily of polyurethane.

The widespread production of PU foam products is based on the use of a mixture of a polyol system and a blowing agent embodied by a liquid having a relatively low boiling temperature, this mixture being brought to react with isocyanate to produce a polymerization of the polyol, whereby heat is generated sufficiently to cause the blowing agent to boil and to thereby produce vapour conditioning the formation of blisters or cells in the material.

A blowing agent well suited for this purpose is monofluortrichloromethane, also called Freon 11, CFC-11 or R-11, the boiling point of which is approximately 24° C., i.e. just suitable for a foam production under normal room temperature conditions. A large proportion of the relevant products is used for heat insulation purposes, and to this end it is also important that R-11 has a high molecular weight, as the vapour filling of the cells will hereby contribute to a high insulation capacity.

Thus, through many years the production of PU foam products has been based on the use of the relatively cheap and easily accessible R-11, but as now known it has been found that there are heavy environmental problems connected therewith, as the R-11 seems responsible for a certain destruction of the protective ozone layer surrounding our planet.

On this background huge scientific efforts have been made for finding a practically applicable substitute for R-11, but so far without usable results. There are plenty of proposals from the world of the laboratories, where several presumed useful ingredients have been suggested, but practically all having the important drawback that neither now nor in any near future these ingredients will be accessible in any commercially realistic manner.

The methodic research for an R-11-substiture has, naturally, been concentrated primarily about the group of liquids related to R-11, i.e. the halogenated carbon hydrogens, of which several show the desired high molecular weight. Some of these liquids could be well usable as a blowing agent, even without badly influencing the said ozone layer, but unfortunately with certain unacceptable drawbacks. As an example, methylenechloride having a boiling point of some 47° C. could perhaps be usable, but may be non-healthy. When such beforehand unusable liquids are sorted out from the said relevant group of liquids only very few liquids will be left, and the remaining liquids, unfortunately, suffer from the drawback that their boiling points are either far too high or far too low to be relevant for the required boiling at a temperature reasonably close to normal room temperatures. Thus, the boiling point of R-22 is some −40° C.

It should be mentioned that just R-22 nevertheless has been suggested as a blowing agent long before the recent scientific research based on the said ozone problems. Thus, already in U.S. Pat. No. 3,391,093 it is emphasized that R-22 is advantageous to R-12 in that it is more easily soluble in the polyol, and a good solubility is decisive for the vapour generation conditioning a low density of the foam product. It is evident, however, that R-11 is or has been advantageous to R-12, partly because it is still better soluble and partly because it can be handled at room temperature at ambient pressure.

It has also been suggested to use as a blowing agent various mixtures of the different relevant liquids, e.g. R-11 and R-12 or R-11 and R-22, but this has not led to industrially usable results for mixtures without R-11. In most cases, where R-11 is not used, it is prescribed to use foaming machines, where an initial foaming takes place under the influence of one mixture component already in a delivery nozzle, while the other component is added separately immediately next to the nozzle, viz. such that until the mixing of the components it has been possible to handle the components separately by suitable respective temperature and pressure conditions. In practice, however, it is of course highly preferential to make use of a compound already including all the required blowing agent and being usable at ambient temperature and pressure merely by being led together with the isocyanate. This is what has been possible with the use of R-11.

An R-11-free blowing agent for such a use at a commercial scale has not been provided by the scientific research so far, but such an agent is provided by the present invention. According to the invention it has been found that an excellent blowing agent can be obtained as a mixture of two liquids selected directly from the relevant group of substances, but each one being absolutely unusable by having a boiling temperature widely different from the ambient temperature. One of these substances is 1.1.1. trichloroethane, the boiling point of which is as high as 75°–76° C., while the other substance is difluoromonochloromethane, i.e. the said R-22, the boiling point of which is as low as approximately −41° C. 1.1.1. trichloroethane is a cheap, soluble, well usable substance, which has a high molecular weight; the relatively very high boiling point thereof can be lowered by admixing it with the low boiling R-22, which is also a well usable substance of a relatively high solubility. Despite the widely different boiling points of the two substances it has been found that they are extremely well suited to form a mixture having a boiling point or a boiling point range very close to that of R-11, such that the simple mixture according to the invention will be usable almost directly as a substitute for R-11. It is extra advantageous that the boiling point may be adjusted according to the circumstances by adding more or less R-22 to the 1.1.1. trichloroethane, preferably in the proportion range of 5–30 parts to 100 parts, respectively.

In this connection it is important that the mixture is extremely well soluble in the usual polyol systems. By the said composition variation the mixture itself will have a boiling point range of some 5°–25° C., while when present as effectively dissolved in the polyol system the starting boiling point of the system will be some 25°–40° C., which is ideal and widely corresponding to the use of R-11.

R-22 itself is not as soluble as R-11, but with the presence of 1.1.1. trichloroethane the solubility becomes perfect, and it is fully possible to obtain foam densities as low as with the use of R-11. Generally it is a surprising fact that the two substances with their different characters and their mutual boiling point difference of more than 100° C. act, in the mixture, widely just like R-11.

This also applies to a certain degree with respect to the catalysts used for ensuring a uniform and reasonably rapid foaming and setting of the foam. For some applications an acceptable foam production is achievable solely by substituting R-11 for the blowing agent according to the invention, while otherwise maintaining a conventional dispensary and normal process conditions. Many different dispensaries are in use, some even involving secrecies, but it has been found that usable foam products may be manufactured as here disclosed, based on various common dispensaries referring to R-11.

However, the mere substitution of R-11 for the blowing agent of this invention will not normally result in a foam product of the same high quality as with the use of R-11. The broad boiling range of the agent changes the process conditions, and it may well be observed that the vapour generation towards the end of the foaming process is diminished to such a degree that the material is widely polymerized and stabilized before the foam is fully developed, whereby the density of the foam product may be undesirably high. It has been found, however, that this drawback can be avoided quite simply, viz. by supplementing the starting catalyst by a further catalyst specialized to be operative at an increased temperature in the compound being foamed.

It is remarkable that this desired effect is in fact achievable with the use of already well known catalysts developed for accelerating the final setting of the foam product. Such catalysts, based on tertiary amines and known e.g. as DABCO 33 LV and/or DABCO WT (Air Products, U.S.A.), also show the inherent effect of promoting the vaporization of any remaining amount of blowing agent; while in R-11-based systems such a remaining amount will typically be very small the corresponding amount in connection with the invention will be much larger due to the widened boiling point interval of the blowing agent, but nevertheless it has been found that the said known catalyst—even used at a relatively low percentage as explained in more detail below—is able to promote the vaporization even of the said higher amount of 'remaining blowing agent' at the higher temperature level. Although the discussed catalysts have been developed particularly for use in R-11-based systems they seem to be directly applicable with the invention without any noticeable drawbacks, and they make it possible to obtain foam products without R-11 and with quite low densities, e.g. down to 15-20 kg/cm$^3$.

It is already known that a limited use of water in the basic compound is advantageous, particularly in the initial phase of the foaming process, where the water reacts with the isocyanate so as to develop free $CO_2$, which contributes to the foaming process. It is also known, as mentioned, to make use of a starting catalyst, particularly PM-DETA, which promotes the vapour generation particularly in the initial phase. Another such catalyst is triethylamine, which, however, has a highly unpleasant smell. What is worth noting here is that both the water and the said starting catalysts are fully applicable with their respective advantages also in systems according to the present invention. PM-DETA=pentamethyl diethylen triamine.

With the traditional use of R-11 is connected a considerable cooling of the compound by the evaporation of the R-11, and for ensuring the required rapid supply of energy for increasing the temperature of the foam in production it is or has been necessary to make use of a relatively large amount of catalyst. Generally, in connection with the invention it is possible to use a reduced amount of catalyst, because the vaporization of the blowing agent takes place in a less abrupt manner and over a broader temperature interval, this involving a reduced instant energy demand and therewith reduced catalyst costs.

In connection with foam production it is well known to use special stabilizing agents, so-called surfactants, for stabilizing the cell walls. For use in R-11-systems such surfactants have been developed to a desired high degree of solubility, such that the first developed surfactants, which are now rather cheap, are used in steadily decreasing amounts due to their solubility being relatively poor. With the invention, however, just these 'poor' and cheap surfactants are to be preferred, because the blowing agent mixture is a very efficient solvent; the surfactants tend to be inoperative if they are too effectively dissolved, so for that reason the 'better' and more expensive surfactants, generally, will not be too advantageous.

It is well known that in R-11 compounds an undesired formation of foam may take place at temperatures even slightly above normal working temperature, due to the R-11 boiling at some 24° C. It will be appreciated that this problem is eliminated or considerably reduced by the present invention because of the associated higher boiling point interval. In practice this will mean that based on the invention it is possible to prepare the basic compounds including polyol(s), catalysts, stabilizers and blowing agent for shipping in ordinary containers even to warm places, without the containers having to be particularly pressure resistent.

The 1.1.1. trichloroethane has a molecular weight which is only slightly lower than that of R-11, i.e. the newly produced foam will be heat insulating almost as effectively as with the use of R-11. It is very important, however, that R-11 with its relatively low boiling point is not filling the cells in any particularly stable or durable manner, while the blowing agent of this invention will fill the cells much more durably, without relatively soon being gradually replaced by air. This leads to the very important result that the general long time insulation effect of the material will be even better compared with the use of R-11.

While the use of the blowing agent according to the invention has thus been found to involve several highly valuable advantages it is worth noting that some inherent disadvantages, which might exist, have not been observed.

The blowing agent may be prepared and sold as a mixture, but the more relevant sales product will be the entire compound including polyol(s), blowing agent and other components, ready for use with isocyanate added thereto in fully conventional manner.

The blowing agent mixture can be prepared in a very simple manner by introducing R-22 from a pressure vessel holding the R-22 in its liquid phase into a pressure container holding the 1.1.1. trichloroethane. The resulting mixture may then under ambient pressure be added to the liquid compound consisting of a mixture of polyol, catalysts, surfactant and possible further ingredients, preferably by stirring, whereafter the entire mixture may be filled in ordinary drums to be shipped.

At the place of use the mixture may be handled and used almost exactly or conventionally as had it been an R-11-based compound, i.e. in admixture with isocyanate, and it should be emphasized that the foaming may proceed as an ordinary free foaming without any differentiated handling of the components of the blowing agent mixture. A single special precaution may be desirable when the foam is produced in a moulding cavity, viz. to keep the walls of the moulding cavity heated a little more than with the use of R-11 systems; it has been normal practice to heat the walls to some 40° C. in order to avoid a surface compaction of the foam, which would occur as a result of the blowing agent being cooled next to the surface, and since the boiling temperature in the present connection is normally increased it may be preferable to heat the cavity walls e.g. up to 50°-60° C.

In the following the invention is illustrated by some examples:

EXAMPLE 1:

It is desired to produce a heat insulating foam, e.g. for filling out in situ a connector mantle pipe over a joint in a district heating pipeline, and it is desired to use a fully conventional polyol and catalyst system to be handled fully conventionally, all with the one exception that a blowing agent according to the invention is used in lieu of R-11. The basic compound is as follows:

| | |
|---|---|
| ICI Daltolac P 160 basic polyol (OH value 540) | 0.373 kg |
| ARCO Arcol 3541 basic polyol (OH value 490) | 0.373 kg |
| Shell Caradol 36-3 basic polyol (OH value 36) | 0.046 kg |
| Glycerine (99%) | 0.025 kg |
| Water | 0.008 kg |
| BASF Triethylamine (amine catalyst) | 0.011 kg |
| BP Polyurax SR 242 (surfactant) | 0.014 kg |
| Blowing agent "20" | |
| = 100 parts 1.1.1. trichloroethane | 0.150 kg |
| 20 parts R-22 | 1.000 kg |

To this compound was added 1 kg ICI Suprasec DNR MDI isocyanate, and the following data were observed:

| | |
|---|---|
| Cream time (starting time) | 45 secs |
| Gel time (fiber time) | 200 secs |
| Rise time | 250 secs |
| Tack-free time | 250 secs |
| Free rise density | 48 kg/m³ |
| Core temperature | 131° C. |
| Max. core temperature reached after | 840 secs |

EXAMPLE 2:

A refrigerator unit is to be provided with an insulation of a widely homogeneous foam with low density. A basic compound of the following formulation is used:

| | |
|---|---|
| ARCO Arcol 3544, | 0.576 kg |
| Medium molecular weight polyoxypropylene polyol | |
| ARCO Arcol 3770, | 0.074 kg |
| Aromatic amine polyoxypropylene ether polyol | |
| Goldschmidt Tegostab B 1048 (surfactant) | 0.015 kg |
| Water | 0.007 kg |
| BASF PM-DETA (amine catalyst) | 0.003 kg |
| Air Products DABCO 33 LV (tertiary amine catalyst) | 0.012 kg |
| Blowing agent "20" as in example 1 | 0.314 kg |
| | 1.000 kg |

To this compound was added Shell Caradate 30 MDI isocyanate in weight proportion 1:1, and following data were observed:

| | |
|---|---|
| Cream time (starting time) | 21 secs |
| Gel time (fiber time) | 75 secs |
| Rise time | 90 secs |
| Tack-free time | 90 secs |
| Free rise density | 22.4 kg/m³ |
| Core temperature | 119° C. |
| Max. core temperature reached after | 570 secs |

EXAMPLE 3:

The preparation according to Example 2 was repeated with the sole difference that the composition of the blowing agent "20" (see Example 1) was changed to 85:10:5 p.b.w. of 1.1.1. trichloroethane, R-22 and butane, respectively. All other data were the same, or found to be practically unchanged; the density, however, was reduced to 21 kg/m³.

EXAMPLE 4:

A semi flexible PUR foam for furniture arm rests was based on the following compound:

| | |
|---|---|
| Shell Caradol 36-3 basic polyol (OH value 36) | 0.680 kg |
| BASF Butanediol 1.4 | 0.136 kg |
| TCPP (fire retarder) | 0.068 kg |
| DMEA (amine catalyst) | 0.014 kg |
| DBTL (tin catalyst) | 0.001 kg |
| Blowing agent 85:10:5 as in Example 3 | 0.102 kg |
| | 1.000 kg |

To this compound was added ICI Suprasec VM 10 pure MDI isocyanate in weight proportion 1:0.4, and following data were observed:

| | |
|---|---|
| Cream time (starting time) | 15 secs |
| Gel time (fiber time) | 20 secs |
| Rise time | 20 secs |
| Tack-free time | 25 secs |
| Free rise density | 357 kg/m³ |
| Core temperature | 110° C. |
| Max. core temperature reached after | 420 secs |

EXAMPLE 5:

For the continuous production of a spray foam to be sprayed onto building surfaces such as roof undersides as a stabilizing and insulating layer thereon the following basic compound was used:

| | |
|---|---|
| Shell Caradol 585 amine initiated polyol (OH 585) | 0.323 kg |
| ICI Daltolac P 160 base polyol (OH 540) | 0.143 kg |
| ARCO-Arcol 3541 polyether polyol (OH 490) | 0.143 kg |
| Triethanolamine 85% (amine catalyst) | 0.034 kg |
| Tall oil | 0.041 kg |
| Texaco DMEA (amine catalyst) | 0.039 kg |
| BASF PM-DETA (amine catalyst) | 0.008 kg |
| DBTL Organic tin catalyst | 0.001 kg |
| Trichloropropyle phosphate (fire retarder) | 0.103 kg |
| Goldschmidt Tegostab B 1048 (surfactant) | 0.124 kg |
| Water (if desired) | 0.002 kg |
| Blowing agent "20" as in Example 1 | 0.147 kg |

The compound was mixed with Bayer Desmodur 44V20 MDI-isocyanate in the weight ratio 1:1, and the following data were observed:

| | |
|---|---|
| Cream time (starting time) | 7-8 secs |
| Gel time (fiber time) | 15 secs |
| Rise time | 30 secs |
| Tack-free time | 20 secs |
| Free rise density | 42.4 kg/cm³ |
| Core temperature | 165° C. |
| Max. core temperature reached after | 300 secs |

EXAMPLE 6:

A light polyether furniture foam (slab stock) is produced based on the following compound:

| | |
|---|---|
| Shell Caradol 36-3 basic polyol | 0.832 kg |
| DBTL (organic tin catalyst) | 0.003 kg |
| Goldschmidt Tegostab BF 2370 (surfactant) | 0.008 kg |
| BASF PM-DETA (amine catalyst) | 0.002 kg |
| Water | 0.030 kg |
| Blowing agent "20" as in Example 1 | 0.125 kg |

To this compound was added Bayer toluene diisocyanate (TDI 80/20) in weight proportion 1:0.383, and the following data were observed:

| | |
|---|---|
| Cream time (starting time) | 5 secs |
| Rise time | 80 secs |
| Free rise density | 20.2 kg/cm$^3$ |

EXAMPLE 7:

For the production of a fire retarded polyisocyanurate filling foam (PIUR) the following basic system is used:

| | |
|---|---|
| ARCO Arcol 3541, Polyoxypropylene polyether polyol (OH 475) | 0.689 kg |
| Air Products Dabco TMR-2 (trimerisation catalyst) | 0.024 kg |
| Goldschmidt Tegostab B 1048 (surfactant) | 0.010 kg |
| Water | 0.002 kg |
| Blowing agent "20" as in Example 1 | 0.275 kg |
| | 1.000 kg |

To this compound was added Bayer Desmodur 44V20 MDI isocyanate in weight ratio 1:1, and following data were observed:

| | |
|---|---|
| Cream time (starting time) | 30 secs |
| Gel time (fiber time) | 65 secs |
| Rise time | 77 secs |
| Tack-free time | 75 secs |
| Free rise density | 39.2 kg/cm$^3$ |
| Core temperature | 155° C. |
| Max. core temperature reached after | 390 secs |

EXAMPLE 8:

For comparison two similar basic compounds of a standard polyol and a blowing agent in the form of R-11 and "20" (see Example 1), respectively, were prepared. In both cases the same formulation was used, viz.

| | |
|---|---|
| Polyoxpropylene polyether polyole (OH 475) | 0.714 kg |
| Blowing agent | 0.286 kg |

In both cases a compound boiling point of 33° C. was found. An important difference was found in that the mixture with R-11 shows a vapour pressure of 0.17 bars at 25° C., while the mixture with blowing agent "20" according to the invention did not reveal any measurable overpressure.

Generally, confer Example 3, the blowing agent according to the invention may be modified by the addition of a minor amount of butane, which has a good blowing capacity, i.e. develops a relatively high vapour volume. In principle the R-22 component could be replaced by butane, but a certain content of R-22 is desirable in practice for obtaining a sufficient solubility of the blowing agent. Usable equivalents to butane will be propane and pentane, i.e. saturated hydrocarbons having three to five carbon atoms. A preferred percentage thereof will be about five, hardly exceeding ten.

In most of the examples is used a blowing agent "20" referring to 20 parts of R-22 in 100 parts of 1.1.1. trichloroethane. This proportion has been found suitable for use in Denmark, but in warmer climates the boiling point of the basic compound should preferably be somewhat higher, i.e. the proportion of R-22 should be smaller, e.g. only 10-15 parts, while under arctic conditions it should be higher. Normally the R-22 proportion will range between 10 and 25 parts per 100 parts of 1.1.1. trichloroethane, but in extreme cases the R-22 proportion can go down to 5 parts and up to some 30 parts, all parts being parts by weight.

By an incorporation of butane or the like the total amount of low boiling blowing agent may be somewhat smaller than with the use of R-22 alone; the above mentioned proportion of 85:10:5 will thus correspond to some 100:17:6 by weight for 1.1.1. trichloroethane and R-22/butane, respectively.

It is to be mentioned that there are two substances, viz. trichloroethylene and perchloroethylene, which are widely equivalent to 1.1.1. trichloroethane and—moreover—are of a commercially available type. There is a reason to believe that one or both of these substances may at least partly substitute the 1.1.1. trichloroethane in the present connection. However, the invention is devoted to the practical commerical exploitation of the R-11-free blowing agent, and it will comprise the use of these other substances only to the extent these are found applicable in commerical practice.

The blowing agent according to the invention will be well suited for the foaming up of systems or compounds other than just PUR-systems, e.g. for the foaming up of PVC, epoxy; unsaturated polyesters, phenoles, polystyrene, etc., where the foaming process is much simpler and where it is often actual to aim at a higher insulation effect and—of course—at the use of cheap and generally non-dangerous substances.

It has been measured that the presence of free vapour of 1.1.1. trichloroethane immediately above the foamed up mixture is very low, less than half the international TLV (threshold limit value).

As well known, also in other fields of the art there are problems with respect to various "Freon" types contributing to attack the ozone layer of the stratosphere, and it will be appreciated that the mixture or blowing agent according to the invention may well be able to substitute the doubtful Freon substances in several connections. Such uses will be within the scope of the invention to the extent they are commercially realistic, e.g. as refrigerants or blowing agents for other purposes. Thus, the invention will comprise the discussed mixture as far as it is usable, directly or as a basic mixed substance for further modification for particular purposes.

Some experts are of the opinion that also R-22 belongs to the said 'doubtful' CFC-substances; even if this is true it will be appreciated that the R-22 constitutes the minor fraction of the two main ingredients in the present mixture, so it will still be an important result that at least a drastic reduction of the use of 'doubtful substances' will be obtainable, until something still better might be found.

It should be mentioned that the foregoing examples refer to laboratory tests under free rise conditions and at a room and ingredient temperature of 21° C. By associated practical experiments in production it was found that the trends of changes between laboratory results and practical results were almost exactly the same as with the use of R-11, and so were the effects of changed production conditions, i.e. to the skilled person there will be no need to describe this in more detail.

I claim:

1. A method of foaming a polyurethane whereby polymer forming components are mixed with a liquid blowing agent constituted by a mixture of 1,1,1 trichloroethane and difluoromonochloromethane to produce a foamed polyurethane product.

2. A method according to claim 1, in which the blowing agent comprises difluoromonochloro-methane and 1.1.1. trichloroethane in a weight ratio of 1:3 or less.

3. A method according to claim 1, in which the blowing agent furthermore comprises butane, propane or pentane, preferably substituting a part of the difluoromonochloro-methane.

4. A method according to claim 3, in which the blowing agent is mainly constituted by a mixture of 1.1.1. trichloroethane, difluoromonochloro-methane and butane/propane/pentane in a weight ratio of the magnitude 85:10:5, respectively.

5. A method according to claim 1, whereby a catalyst is used for promoting the vapour production of the blowing agent, characterized by the use of at least two different catalysts, which are selectively active over respective temperature ranges at the beginning and the end of the boiling point interval of the compound as conditioned by the said blowing agent mixture.

6. A method according to claim 1, in which the component 1.1.1. trichloroethane in the blowing agent mixture is entirely or partly substituted by trichloroethyene and/or perchloroethylene.

* * * * *